April 9, 1963 K. T. GARTY ETAL 3,084,991
PRODUCTION OF AN ARYL EPOXY ETHER POLYMER STRUCTURE
Filed July 1, 1959
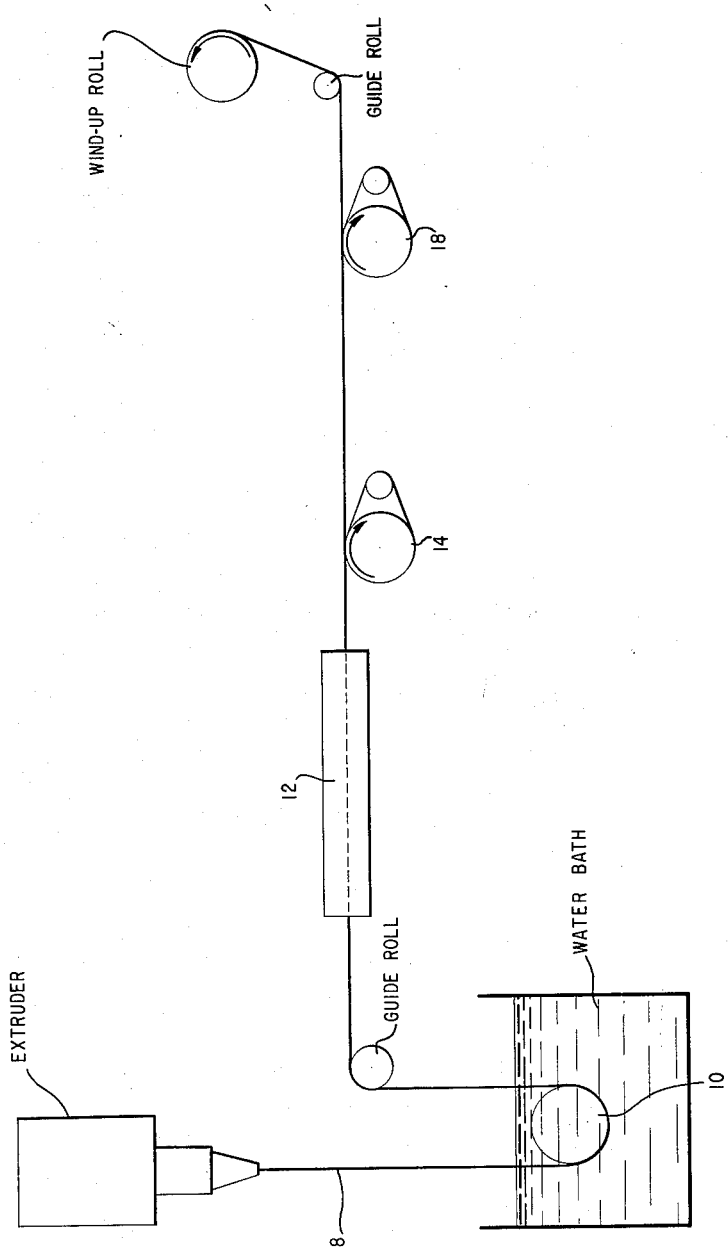
INVENTORS
KENNETH T. GARTY
THOMAS B. GIBB, JR.
BY JOHN A. STENSTROM
ATTORNEY 3,084,991
PRODUCTION OF AN ARYL EPOXY ETHER
POLYMER STRUCTURE
Kenneth T. Garty, Somerville, Thomas B. Gibb, Jr., Murray Hill, and John A. Stenstrom, Middlesex, N.J., assignors to Union Carbide Corporation, a corporation of New York
Filed July 1, 1959, Ser. No. 824,195
5 Claims. (Cl. 18—54)

This invention relates to the production of shaped structures of aryl epoxy ether polymers. More particularly, this invention relates to the production of elongated structures of aryl epoxy ether polymers such as films, filaments, and the like.

Shaping of aryl epoxy ether polymers into elongated structures has been generally accomplished by heating the polymer to its "melt" state, extruding the polymer into an elongated structure and stretching the extruded polymer to obtain a structure having the desired physical measurements, e.g., in the case of a flat film, the desired thickness and width, and in the case of a filament the desired diameter. It has been found, however, that elongated structures so produced are non-uniform in shape, are generally brittle and weak, and consequently have poor mechanical strengths, i.e., poor tensile strengths and the like. For obvious reasons, such elongated structures of aryl epoxy ethers are difficult to process and have found only limited use in applications wherein elongated plastic structures generally have found utility, for example in the manufacture of woven materials and the like.

The present invention provides for the production of elongated structures of aryl epoxy ether polymers which are characterized by excellent mechanical strengths and by uniformity of shape, that is, uniform thickness and width in the case of a flat film and uniform diameter in the case of a filament. The elongated structures of the present invention are also non-tacky, smooth surfaced, and present no processing problems.

According to the present invention, an aryl epoxy ether polymer is extruded into the form of an elongated structure above about its first order phase transition temperature, cooled below about its second order phase transition temperature, reheated to a temperature of about 5° C. to about 150° C. above its second order phase transition temperature and immediately stretched to effect an orientation of the molecules thereof.

Reference is now made to the accompanying drawing which, along with the discussion that follows, will more fully describe the present invention.

An elongated structure of a polymer of an aryl epoxy ether 8, as for example a filament, is extruded from an extruder at a temperature above about its first order phase transition temperature, directly into a water bath. In the water bath, elongated structure 8 passes under driven roll 10 and is cooled therein to a temperature below about its second order phase transition temperature. Elongated structure 8 is then passed out of the water bath, over a guide roll and then into and through heating zone 12. In heating zone 12, elongated structure 8 is heated to a temperature of between about 5° C. and 150° C. in excess of its second order phase transition temperature. Stretching of elongated structure 8 is effected between godet roll assembles 14 and 18 by operating godet roll assembly 18 at a linear speed greater than that of godet roll assembly 14. Elongated structure 8 can then be wound upon a wind-up roll as is shown in the drawing.

The first and second order phase transition temperatures of aryl epoxy ether polymers as noted in this specification were determined by methods described in an article by Alexander Brown appearing in Textile Research Journal, vol. 25, 1955, page 891.

The term aryl epoxy ether polymers as used herein is intended to encompass homopolymers, as well as copolymers and interpolymers, produced by polymerizing a mixture containing two or more monomeric aryl epoxy ethers.

Among aryl epoxy ethers and mixtures thereof which can be polymerized to produce normally solid polymers which can be extruded into shaped structures according to the present invention are those represented by the formula:

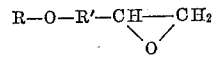

wherein R is an aryl or substituted aryl group and R' is a divalent saturated aliphatic hydrocarbon group. Illustrative radicals for R' include, among others, methylene, ethylene, propylene, butylene, hexylene, octylene, and the like. Representative radicals for R include, among others, phenyl, 2-, 3-, and 4-methylphenyl, 4-isopropylphenyl, 4-tertiary butylphenyl, 4-octylphenyl, and the like.

Suitable aryl epoxy ethers include 1,2-epoxy-3-phenoxypropane, 1,2-epoxy-4-phenoxy-butane, 1,2-epoxy-5-phenoxy-pentane, 1,2-epoxy-6-phenoxy-hexane, 1,2-epoxy-3-(o-methylphenoxy)-propane, 1,2-epoxy-3-(m-methylphenoxy)-propane, 1,2-epoxy-3-(p-methylphenoxy)-propane, 1,2-epoxy-3-(o-isopropylphenoxy)-propane, 1,2,-epoxy-3-(p-tertiary butylphenoxy)-propane, 1,2-epoxy-3-(p-octylphenoxy)-propane, 1,2-epoxy-3-(o-chlorophenoxy)-propane, 1,2-epoxy-3-(2,4-dimethylphenoxy)-propane, 1,2-epoxy-3-(2,3-dimethylphenoxy)-propane, 1,2-epoxy-3-(2,6-dimethylphenoxy)-propane, 1,2-epoxy-3-(2-chloro-4-methylphenoxy)-propane, 1,2-epoxy-3-(o-amylphenyl)-propane, 1,2-epoxy-4-(o-methylphenoxy)-butane, 1,2-epoxy 4-(2,4-dimethylphenoxy)-butane, 1,2-epoxy-4-(2,6-dimethylphenoxy)-butane, 1,2-epoxy-4-(2,4-dichlorophenoxy)-butane, 1,2-epoxy-4-(2,6-dichlorophenoxy)-butane, 1,2-epoxy-6-phenoxy-hexane, 1,2-epoxy-6-(2,3-dibromophenoxy)-hexane, and the like.

Method of producing normally solid polymers of aryl epoxy ethers is described in copending application, Serial No. 824,191, filed concurrently herewith.

Extrusion of an aryl epoxy ether into the shape of an elongated structure can be accomplished by means of conventional extrusion apparatus. The polymer, generally in the form of small pellets, is fed into a conventional extruder, heated therein to its "melt" state, i.e., above about its first order phase transition temperature, and extruded therefrom in the shape of an elongated structure such as a filament. The structure is then cooled below about the second order phase transition temperature by any convenient cooling means. Cooling of the elongated structure can be conveniently accomplished by passing it through a water bath which is maintained at a temperature sufficient to lower the temperature of the elongated structure to or below its second order phase transition temperature. Actually, any material can be used as a coolant as long as it has no deleterious effect on the elongated structure. For example, glycerine can be used in lieu of water. Also, the elongated structure can be cooled by passing it through an inert gaseous medium maintained at a temperature sufficient to cool the structure as described. The structure is not cooled to such low temperatures that it becomes brittle and fractures easily.

Once cooled, the elongated structure is brought to a temperature of from about 5 to about 150° C. above its second order phase transition temperature and stretched while within this temperature range, whereby the molecules thereof are oriented. Generally, the percent stretch effected in the elongated structure is at least about 100.

The elongated structure is conveniently brought to a temperature of about 5° C. to about 150° C. above its second order phase transition temperature by positioning the stretching mechanism, usually a pair of godet rolls, a suitable distance away from the cooling bath and heating the structure as it passes from the cooling bath to the godet rolls. Positive heating of the elongated structure can be accomplished by passing the structure through a heating bath, for example, a bath of glycerine. In those instances where the temperature of the surrounding atmosphere heats the elongated structure to the desired temperature, positive heating means such as the glycerine bath previously mentioned can be eliminated. The godet rolls, which are conveniently used to stretch the elongated structure, are run at a speed such that there is substantially no stretching of the elongated structure until it has been cooled and then brought to a temperature of about 5° C. to about 150° C. above its second order phase transition temperature.

Once the elongated structure is stretched, it can be annealed and further stretched in a liquid bath maintained at temperatures of from about 50° C. to about 175° C.

The procedure used to determine the reduced viscosity values noted in the examples of this application was as follows. A 0.05 gram sample of polymer was weighed into a 25 ml. volumetric flask and p-chlorophenol containing 2 percent by weight pinene added thereto. The flask was heated for 30 minutes in an oil bath maintained at 140° C. with intermittent swirling. After solution was complete, additional p-chlorophenol containing 2 percent by weight pinene was added to produce 25 ml. solution while maintaining the flask in a 47° C. constant temperature bath. The solution was thereafter filtered through a sintered glass funnel and the viscosity of a 3 ml. sample determined in a Cannon viscometer at 47° C.

Reduced viscosity was computed by use of the equation:

$$RV = \frac{ts - to}{cto}$$

where:

*to* is the efflux time for the solvent
*ts* is the efflux time for the polymer solution
*c* is the concentration of the solution in terms of grams of polymer per 100 ml. of solution Percent stretch noted herein was determined by dividing the linear speed of second godet rolls by the linear speed of the first godet rolls and multiplying by 100.

Melt index values noted herein were determined according to ASTM method No. D-1238-57T.

The ofllowing examples further illustrate the present invention and are not to be construed as limiting the scope of the invention in any manner.

*Example 1*

A polymer of 1,2-epoxy-3-phenoxy-propane having a reduced viscosity of 9 and a melt index of 3 at 225° C./1P and a second order phase transition temperature of about 17° C. was fed into a one-inch extruder, the back half of which was heated to a temperature between 190° C. and 195° C. and the front half to a temperature between 280° C.-290° C., and extruded through a 0.07 inch diameter die orifice heated at 270° C. at a speed of 8 feet/min. into the form of a filament.

The filament was extruded downward into a bath of ice water. From the ice bath the filament was drawn to a set of godet rolls and stretched at a temperature of about 22° C. which is about 5° C. in excess of its second order phase transition temperature, i.e., 17° C. The first godet roll had a linear speed of 8 feet/min.; the second godet roll had a linear speed of about 80 feet/min. This effected a percent stretch of 1000. The stretched filament had a tensile strength (ASTM D-638-58T) of 30,000 p.s.i. and percent elongation (ASTM D-638-58T) at break at 55. The filament was smooth, non-tacky, non-sticky, and tough.

For purposes of comparison, a filament was extruded and stretched as described above with the exception that the filament was not cooled below its second order phase transition temperature, but was cooled to 22° C. and then stretched. The filament was weak and brittle.

*Example 2*

A polymer of 1,2-epoxy-3-phenoxy-propane having a reduced viscosity of 9 and a melt index of 3.7 at 225° C./1P and a second order phase transition temperature of about 17° C., and which had been dried at 110° C. for two hours, was fed to a one-inch extruder, the front end of which was heated to 282° C.-288° C., the back half heated to 193° C., and the die orifice heated to a temperature of 270° C. The diameter of the die orifice was 0.07 inch. The polymer was extruded downward in the shape of a filament into an ice bath from where it was passed to a take-off godet roll located adjacent the ice bath, traveling at a linear speed of 6.5 feet/min. Rate of extrusion was also 6.5 feet per minute.

The filament was then passed from the ice bath through air (about 23° C.) through a distance of 1½ feet to a glycerine bath heated to 60° C. From the glycerine bath the filament was passed to a second godet roll traveling at a linear speed of 84 feet per minute. The stretching occurred at a temperature of 25° C. as the filament traveled between the first godet roll and the second godet roll. The filament had a percent stretch of 1292. The stretched filament had a tensile strength of 29,400 p.s.i., a knot tensile strength (ASTM D-638-58T) of 24,000 p.s.i., secant modulus at 25° C. and 1 percent elongation (ASTM D-638-58T) of 190,000 p.s.i. and percent elongation (ASTM D-638-58T) at break of 55. The filament was smooth, non-tacky, non-sticky and tough.

*Example 3*

A polymer of 1,2-epoxy-3-phenoxy-propane described in Example 1 was extruded and stretched under the same conditions as in Example 2 with the exception that the second godet roll was traveling at a linear speed of 39 feet per minute. The percent stretch of the filament was 600; the tensile strength was 21,200 p.s.i., and the percent elongation at break was 34. The filament was smooth, non-tacky, non-sticky, and tough.

*Example 4*

A polymer of 1,2-epoxy-3-phenoxy-propane described in Example 1 was extruded and stretched under the same conditions described in Example 2 with the exception that the second godet roll was traveling at a linear speed of 69 feet per minute. The filament had a percent stretch of 1067, a tensile strength of 22,700 p.s.i., and a percent elongation at break of 54. The filament was smooth, non-tacky, non-sticky and tough.

*Example 5*

A polymer of 1,2-epoxy-3-phenoxy-propane described in Example 1 was extruded and stretched in a manner described in Example 2 with the exceptions that the extrusion was 2¼ feet/min., the first godet roll was traveling at a linear speed of 2¼ feet per minute, and the second godet roll was traveling at a linear speed of 18¼ feet/min. The filament had a percent stretch of 810, a tensile strength of 18,400 p.s.i., and a percent elongation at break of 64. The filament was smooth, non-tacky, non-sticky, and tough.

*Example 6*

A polymer of 1,2-epoxy-3-phenoxy-propane described in Example 1 was extruded and stretched under the conditions described in Example 1 with the exception that the filament in traveling from the first godet to the second godet passed through a glycerine bath which was at a temperature of 98° C., and the linear speed of the second godet was 71 feet per minute. The filament was stretched at a temperature of 98° C. The percent stretch of the filament was 1090, its tensile strength was 27,600 p.s.i. and its percent elongation at break was 54. The filament was smooth, non-tacky, non-sticky and tough.

What is claimed:

1. Method of producing a shaped structure of an aryl epoxy ether polymer which comprises extruding said polymer into a shaped structure above about its first order phase transition temperature, cooling said polymer below about its second order phase transition temperature, reheating said polymer to a temperature between about 5 and 150° C. in excess of its second order phase transition temperature and stretching said polymer.

2. Method as defined in claim 1 wherein the polymer is reheated to a temperature between about 5° C. and 100° C. above its second order phase transition temperature.

3. Method as defined in claim 1 wherein the polymer is poly(1,2-epoxy-3-phenoxy-propane).

4. Method as defined in claim 1 wherein the polymer is extruded into the form of a filament.

5. An extruded shape of an aryl epoxy ether polymer produced according to the method described in claim 1.

References Cited in the file of this patent

UNITED STATES PATENTS

| | | |
|---|---|---|
| 2,344,511 | Harder | Mar. 21, 1944 |
| 2,578,899 | Pace | Dec. 18, 1951 |

OTHER REFERENCES

D'Alelio: "Fundamental Principles of Polymerization," page 123, John Wiley & Sons, Inc., New York, 1952.